E. E. NOBLE.
CHAIN LOCK.
APPLICATION FILED MAY 7, 1917.
1,261,052.
Patented Apr. 2, 1918.
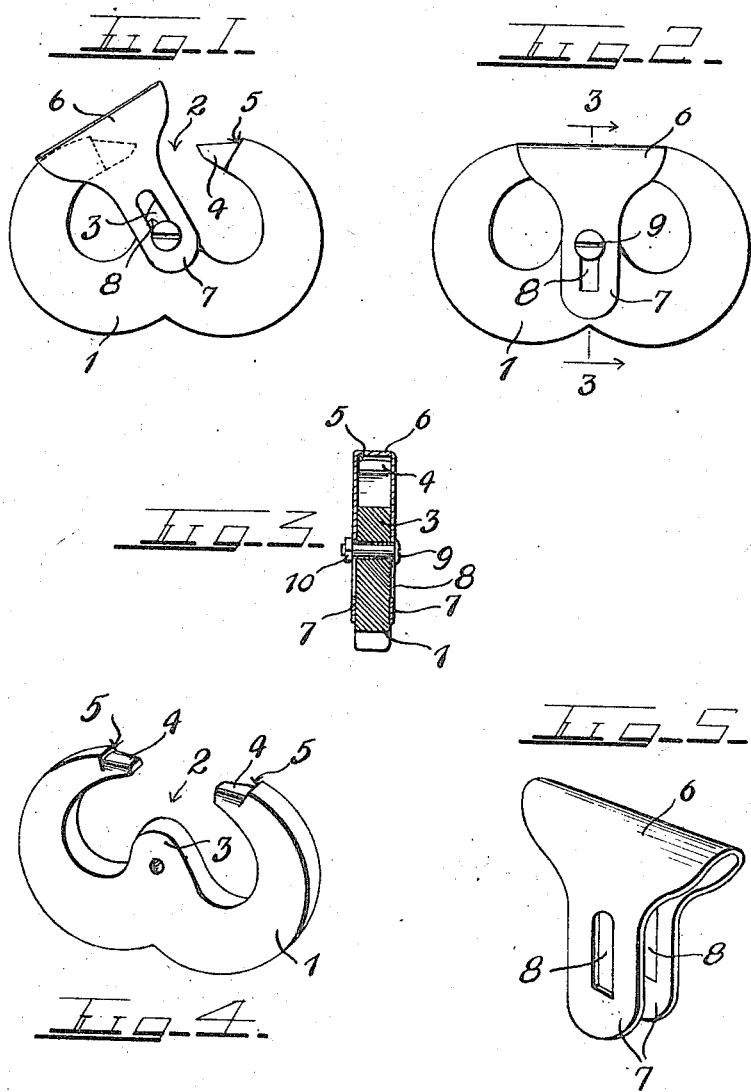
Inventor
E. E. NOBLE

UNITED STATES PATENT OFFICE.

ELMER E. NOBLE, OF YORK, PENNSYLVANIA.

CHAIN-LOCK.

1,261,052.     Specification of Letters Patent.     Patented Apr. 2, 1918.

Application filed May 7, 1917. Serial No. 166,988.

*To all whom it may concern:*

Be it known that I, ELMER E. NOBLE, a citizen of the United States, residing at York, in the county of York and State of Pennsylvania, have invented certain new and useful Improvements in Chain-Locks; and I do declare the following to be a full, clear, and exact description of the invention, such as will enable others skilled in the art to which it appertains to make and use the same.

My invention has for its object to provide an extremely simple yet highly efficient device for connecting the ends of a chain or for joining a number of chains, it being understood, however, that the device may well be used for other purposes.

With the foregoing general object in view, the invention resides in the novel features of construction hereinafter fully described and claimed, the descriptive matter being supplemented by the accompanying drawing which forms a part of this specification and in which:—

Figure 1 is a side elevation of the improved lock in open position;

Fig. 2 is a similar view of the lock with the guard thereof closed and shown in section;

Fig. 3 is a vertical transverse section on the plane of the line 3—3 of Fig. 2;

Fig. 4 is a perspective view of the link; and,

Fig. 5 is a similar view of the guard.

In the drawing above briefly described, the numeral 1 has reference to an open one-piece link having a gap 2 in one of its sides, the opposed side of said link having a lug 3 extending inwardly as shown. The ends of the link 1 are reduced at 4 and shoulders 5 are formed at the juncture of said reduced ends with the body of the link.

An arched guard 6 is provided to receive the reduced ends 4 in its ends and to abut the shoulders 5, said guard having a pair of parallel integral arms 7 contacting frictionally with the opposite sides of the lug 3. The guard 6 and its arms are preferably stamped from a single piece of sheet metal and the link 1 may also be formed of a stamping, but it is to be understood that this construction is not essential.

The arms 7 are formed with longitudinal slots 8 through which a clamping bolt 9 extends, said bolt passing transversely through the lug 3 and having a nut 10.

In use, the chain links to be connected are hooked over the ends of the link, the guard 6 being movable in both directions to permit the links to be applied in this manner. After engagement of the chain links with the link 1, the guard 6 is positioned as depicted in Figs. 2 and 3, and tightening of the nut 10 will then clamp the arms 7 and lug 3 in contact to hold said guard in place.

From the foregoing, taken in connection with the accompanying drawing, it will be obvious that although the invention is of extremely simple and inexpensive nature, it will efficient and durable for establishing either temporary or permanent connections between the ends of chains and the like.

I claim:—

1. A chain connecting device comprising an open link having a gap at one of its sides and having an integral lug extending inwardly from its opposite side, an arched guard bridging said gap and receiving the ends of the link in its ends, said guard having a pair of arms extending from its sides and contacting with the opposed sides of said lug, said arms having longitudinal slots, and a clamping bolt passing through said lug and slots, said guard being movable toward either end of the link and having said bolt as its pivot.

2. A chain connecting device comprising an open link having a gap at one of its sides and an integral lug extending inwardly from its opposite side, the ends of said link being reduced to form shoulders, an arched guard bridging the aforesaid gap and abutting said shoulders at its ends, said ends of the guard receiving said reduced ends of the link, a pair of arms extending from the sides of said guard and contacting with the opposite sides of said lug, said arms having longitudinal slots, and a clamping bolt passing through said lug and slots.

In testimony whereof I have hereunto set my hand in the presence of two subscribing witnesses.

ELMER E. NOBLE.

Witnesses:
NOAH C. MAY,
JOHN C. DEETER.

Copies of this patent may be obtained for five cents each, by addressing the "Commissioner of Patents, Washington, D. C."